United States Patent [19]

Topputo

[11] 4,253,084
[45] Feb. 24, 1981

[54] SNAP SWITCH ALARM

[76] Inventor: Michael Topputo, 1452 Potters Blvd., Bayshore, N.Y. 11706

[21] Appl. No.: 82,798

[22] Filed: Oct. 9, 1979

[51] Int. Cl.³ .............................................. B60R 25/10
[52] U.S. Cl. ...................................... 340/63; 340/568; 340/572
[58] Field of Search ................... 340/63, 568, 571, 572

[56] References Cited

U.S. PATENT DOCUMENTS

| | | | |
|---|---|---|---|
| 1,131,405 | 3/1915 | Merrill | 340/63 |
| 1,667,650 | 4/1928 | Bradley et al. | 340/63 |
| 4,137,521 | 1/1979 | Martinez | 340/63 |

*Primary Examiner*—Alvin H. Waring
*Attorney, Agent, or Firm*—Marvin Feldman; Stephen E. Feldman

[57] ABSTRACT

An alarm system which is actuated by the unfastening of a snap used on the covering for an automobile or boat. A push-button switch and switch connections make electrical contact when the snap sections are disengaged. Any unauthorized snap disengagements will set off an alarm.

5 Claims, 3 Drawing Figures

SNAP SWITCH ALARM

FIELD OF THE INVENTION

The invention relates to a system to actuate any alarm upon the unfastening of the snap of a vehicle cover.

BACKGROUND OF THE INVENTION

Many automobile and boat owners are plagued with the problem of the unauthorized intrusion of their vehicles. Owners whose vehicles have soft coverings such as canvas, have increased problems since intrusion is easy. Boat owners especially have large amounts of expensive equipment that is presently secured only by a canvas cover that readily snaps and unsnaps.

Therefore, it is a principal object of the present invention to provide an alarm system which is actuated by the unfastening of the snape used on protective coverings such as in automobile or boats.

DESCRIPTION OF THE PREFERRED EMBODIMENT

Figure 1:
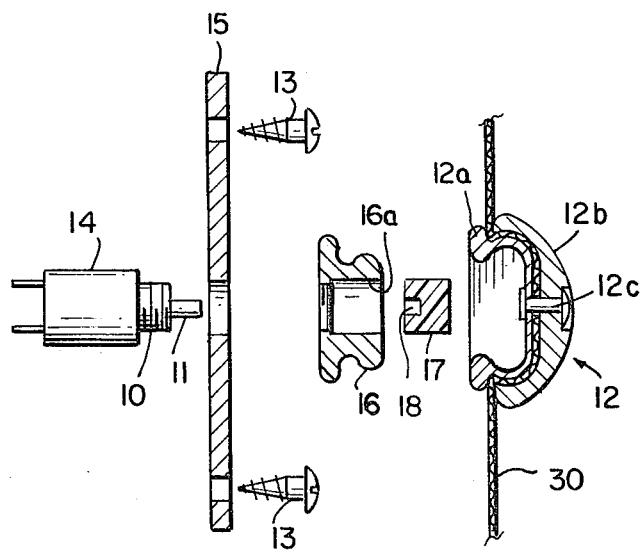
FIG. 1 is an exploded view of the snap switch assembly.

The snap used in the preferred embodiments of the invention comprises two members, namely a male stud 16 and a female cap 12. The stud 16 is essentially cylindrical with a ridge located around its middle to retain the cap 12. The cap 12 is an assembly of three parts. The interior 12a is shaped internally to fit around the stud 16, and to be held in position by the locking action of the ridge around the stud's middle. The cover material 30 is inserted between the interior 12a of the cap 12 and the cap's exterior 12b. The interior and exterior of the cap 12 are then held together by means of a rivet 12c.

Referring to FIG. 1, a hole is tapped through the center of the stud 16. The hole is of sufficient diameter to allow the threaded portion 10 of a push button switch 14 to be screwed into the tapped hole of the stud 16, after the push button switch 14 first passes through a hole in the mounting plate 15. An assembly is made by screwing the stud 16 onto the push button switch 14 with the mounting plate 15 in between. A shaft extension 17 is provided to weatherproof the switch 14 and to extend the shaft so that the switch 14 can be depressed by fastening the cap 12 over the stud 16. This shaft extension 17 is cylindrical with a diameter small enough to allow it to move freely inside hole 16a of stud 16. The shaft extension with the close hole bit also serves to protect and weatherproof the switch. It contains a recess hole 18 to allow it be be inserted on the end of the shaft 11. The shaft 11 is spring loaded inside the switch 14 in the normally electrically closed position. This means that when the shaft 11 is depressed into the switch 14 the electrical contact is broken.

With the female cap off, the shaft extension 17 protrudes past the top of the stud 16. In this position, the shaft 11 is fully extended and the switch 14 is electrically closed.

Figure 2:
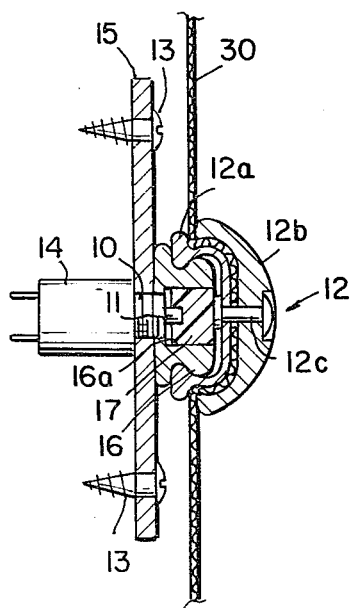
FIG. 2 is a view of the assembly after the snap members are coupled.

Referring to FIG. 2, with the cap 12 is placed in position on top of the stud 16, the shaft 11 is depressed into the switch 14 by the inside of the cap 12, and the switch 14 is electrically open. The cap 12 becomes the only removable part of the assembly and is attached to any vehicle cover 30.

Figure 3:
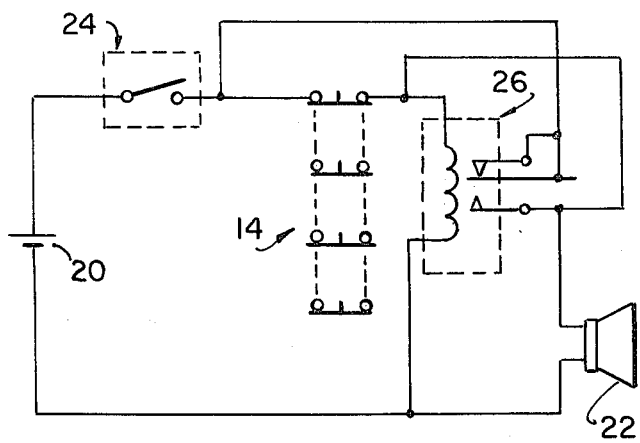
FIG. 3 is an example of the alarm circuit that is actuated by unfastening the snap.

Referring to FIG. 3, the snap assemblies are shown connected in parallel in an alarm circuit. This alarm circuitry itself is of conventional design elements. The snaps with the switch insserted, are placed in strategic points around the cover. Since they are placed in parallel in the circuit, the closing of any one of the switches makes electrical contact and sounds the alarm 22. When the cover 30 is in place, all the switches 14 are depressed into the open position and no electrical contact is made. The unauthorized disengagement of any one of the modified snaps closes the circuit and sound the alarm 22.

Obviously, not every snap on the cover need be used to provide sufficient security. In the preferred embodiment, the battery power 20 and the alarm 22 would be the vehicle's battery and horn. The key switch 24 is located in a series and provide the on/off switch for the system. The latching relay 26 insure that the alarm is sounded until the key switch 24 is turned.

It is to be borne in mind that the present invention is suitable for every type of covering but most preferably for the flexible coverings and more particularly canvas covers for boats, automobiles and the like.

While the aforesaid device is a preferred embodiment of the invention, other preferred embodiments with obvious variations and modifications are within the contemplation of the invention, and such described preferred embodiment is to be considered as merely illustrative and not limiting of the invention, which is defined in the appended claims.

What I claim is:

1. A snap and support assembly comprising:
   (a) a male member and female member;
   (b) a base plate adapted for mounting the male member of the snap;
   (c) a push button switch mounted in combination with the base plate and male member, wherein the switch is located to be operated by depressing its shaft by the fastening of the female member over the male member; and
   (d) a signal alarm means electrically connected to said switch; and
   (e) a vehicle cover mounted in combination with the female member whereby the female member is fastened over the male member when the cover is in position and the female member is disconnected from the male member allowing for the operation of the push button switch when this portion of the cover is opened.

2. An assembly as described in claim 1 wherein an extension is mounted on the end of the shaft of the push button switch providing a means to depress the shaft by enaging the female member over the male member.

3. An assembly as described in claim 2 wherein the shaft extension provides a means for weatherproofing for the switch.

4. An assembly as described in claim 1 wherein the signal alarm means is the horn of the vehicle.

5. An assembly as described in claim 1 wherein the electrical power for the alarm circuit is provided by the vehicles battery.

* * * * *